US012812059B2

(12) United States Patent
Sato et al.

(10) Patent No.: US 12,812,059 B2

(45) Date of Patent: Nov. 24, 2026

(54) IMAGE READING APPARATUS

(71) Applicant: FUJIFILM Business Innovation Corp., Tokyo (JP)

(72) Inventors: Takaharu Sato, Kanagawa (JP); Norikazu Sakai, Kanagawa (JP); Takashi Oda, Kanagawa (JP); Kazunori Sato, Kanagawa (JP); Yuki Hanada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/527,340

(22) Filed: Dec. 3, 2023

(65) Prior Publication Data

US 2025/0008043 A1 Jan. 2, 2025

(30) Foreign Application Priority Data

Jun. 28, 2023 (JP) ................................ 2023-105733

(51) Int. Cl.
*H04N 1/401* (2006.01)
*H04N 1/00* (2006.01)

(52) U.S. Cl.
CPC ......... *H04N 1/401* (2013.01); *H04N 1/00018* (2013.01)

(58) Field of Classification Search
None
See application file for complete search history.

(56) References Cited

U.S. PATENT DOCUMENTS

2020/0314277 A1* 10/2020 Shumiya ............ H04N 1/00824
2024/0179263 A1* 5/2024 Choi ........................ H04N 1/60

FOREIGN PATENT DOCUMENTS

JP 2010011297 1/2010
JP 2013081121 5/2013

* cited by examiner

*Primary Examiner* — Lennin R Rodriguezgonzalez
(74) *Attorney, Agent, or Firm* — JCIPRNET

(57) ABSTRACT

An image reading apparatus includes: a shading roller that has a columnar shape extending in a longitudinal direction and is rotatable about a rotation axis extending in the longitudinal direction, the shading roller including, on an outer peripheral surface, a white reference arc surface which is white, has an arc-shaped cross section in a lateral direction, and extends in the longitudinal direction, and a white reference flat surface which is white, is a flat surface, and extends in the longitudinal direction; an image sensor array that is provided to oppose the shading roller across a transport path of a document, and includes a plurality of image sensors arranged in a main scanning direction and receiving reflected light of light emitted from a light source toward the document or the shading roller; and a processor, wherein the processor calculates difference data indicating a difference between arc surface read data, which indicates pixel values output from the image sensors, respectively, and obtained as the image sensor array receives the reflected light from the white reference arc surface, and flat surface read data, which indicates pixel values output from the image sensors, respectively, and obtained as the image sensor array receives the reflected light from the white reference flat surface, based on the arc surface read data and the flat surface read data, acquires corrected arc surface read data based on the arc surface read data and the difference data, corrects document read data, obtained as the image sensor array receives the reflected light from the document, based on the corrected arc surface read data to acquire corrected document read data, and forms image data corresponding to the document based on the corrected document read data.

5 Claims, 13 Drawing Sheets

IMAGE READING APPARATUS

CROSS-REFERENCE TO RELATED APPLICATIONS

This application is based on and claims priority under 35 USC 119 from Japanese Patent Application No. 2023-105733 filed Jun. 28, 2023.

BACKGROUND

(i) Technical Field

The present invention relates to an image reading apparatus.

(ii) Related Art

Conventionally, an image reading apparatus that reads a surface of a document by a contact image sensor (CIS) while transporting the document has been proposed. The CIS includes an image sensor array including a plurality of image sensors arranged in a main scanning direction. In addition, the image reading apparatus has a shading correction function of correcting unevenness in the amount of light of a light source in the main scanning direction, unevenness in sensitivity of each of the image sensors, or the like in image data obtained by scanning in some cases.

For example, JP2013-81121A discloses an image reading apparatus that reads a front surface of a document by a CIS while transporting a document, the image reading apparatus including a shading roller provided to oppose the CIS across a document transport path. The shading roller has a reference surface for obtaining correction data for shading correction on its outer peripheral surface. The shading roller disclosed in JP2013-81121A is configured such that a distance from the CIS to the reference surface (the outer peripheral surface) changes as the shading roller rotates.

In addition, JP2010-011297A discloses an image reading apparatus including a shading roller provided to oppose a CIS as in JP2013-81121A. In the image reading apparatus in JP2010-011297A, a correction curve including a plurality of correction pixel values for shading correction is prepared in advance for pixel values respectively output from a plurality of image sensors of the CIS arranged in a main scanning direction, and a pixel value affected by dust is detected from among a plurality of pixel values obtained by reading a reference surface of the shading roller based on the correction curve and a pixel value curve including the plurality of pixel values obtained by reading the reference surface of the shading roller.

Image sensors that are used for a scanning process to receive reflected light of light emitted from a light source toward a document are arranged in a main scanning direction. Thus, an image sensor array including a plurality of the image sensors is formed. Meanwhile, a shading roller provided to oppose the image sensor array across a transport path of the document has a columnar shape extending in a longitudinal direction. An outer peripheral surface of the shading roller serves as a reference surface for obtaining correction data for shading correction (hereinafter referred to as shading data). Such a reference surface is white.

Here, it is ideal that the longitudinal direction of the shading roller is parallel to the main scanning direction (that is, an arrangement direction of the image sensor array). However, there is a case where a longitudinal direction of a shading roller SDR is not parallel to an arrangement direction of an image sensor array ISA due to the attachment accuracy of the shading roller SDR or the like as illustrated in FIG. 20. In FIG. 20 (and FIG. 21 described below), an X-axis direction is the main scanning direction, a Y-axis direction is a sub scanning direction, and a Z-axis direction is a height direction. In the present specification, a state where the longitudinal direction of the shading roller is not parallel to the arrangement direction of the image sensor array is sometimes expressed as a state where the shading roller is skewed.

Meanwhile, the amount of light received by the image sensor varies depending on a distance between the image sensor and the outer peripheral surface of the shading roller or the document. Specifically, the amount of light received by the image sensor decreases in proportion to the square of the distance. Therefore, in order to obtain appropriate shading data, it is ideal to obtain shading data by setting the distance from the image sensor to the document and the distance from the image sensor to the outer peripheral surface of the shading roller to be the same.

Here, if the shading roller is skewed in a case where the outer peripheral surface of the shading roller opposing the image sensor array is an arc surface having an arc shape in a cross section in a lateral direction, there occurs a problem that the distance from the image sensor to the outer peripheral surface of the shading roller varies depending on a position in the main scanning direction.

This problem will be described with reference to FIG. 21. FIG. 21 is a perspective view illustrating a state where the shading roller SDR having a circular cross-sectional shape is skewed. It is assumed that a position of the image sensor array ISA and a position of the shading roller SDR in the Y-axis direction coincide at a position where an X-coordinate is x1. Therefore, at the position where the X-coordinate is x1, a distance d1 between the image sensor array ISA and the outer peripheral surface of the shading roller SDR is a distance from the image sensor array ISA to a point on the outer peripheral surface of the shading roller SDR that is closest to the image sensor array ISA (this will be expressed as "directly below" for the sake of simplicity).

On the other hand, at a position where an X-coordinate is x2 away from x1, the position of the shading roller SDR is shifted in the Y-axis direction with respect to the image sensor array ISA since the shading roller SDR is skewed. Therefore, at the position where the X-coordinate is x2, a distance d2 between the image sensor array ISA and the outer peripheral surface of the shading roller SDR is a distance from the image sensor array ISA to a point slightly shifted from the point directly below the shading roller SDR. Since the outer peripheral surface of the shading roller SDR has the arc shape, the distance d2 is the distance longer than the distance d1.

As described above, when the shading roller is skewed, the distance from the image sensor to the outer peripheral surface of the shading roller varies depending on the position in the main scanning direction, and thus, there is a problem that appropriate shading data cannot be obtained. FIG. 22 is a view illustrating examples of the shading data. In FIG. 22, a solid line indicates shading data when the shading roller is skewed, and a broken line indicates appropriate shading data.

SUMMARY

Aspects of non-limiting embodiments of the present disclosure relate to an image reading apparatus that makes it possible to obtain shading data in which an influence of skew is reduced as compared with shading data obtained as an image sensor array receives reflected light from a white reference arc surface, which is the outer peripheral surface of a shading roller, even when the shading roller is skewed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading apparatus comprising:

a shading roller that has a columnar shape extending in a longitudinal direction and is rotatable about a rotation axis extending in the longitudinal direction, the shading roller including, on an outer peripheral surface, a white reference arc surface which is white, has an arc-shaped cross section in a lateral direction, and extends in the longitudinal direction, and a white reference flat surface which is white, is a flat surface, and extends in the longitudinal direction;

an image sensor array that is provided to oppose the shading roller across a transport path of a document, and includes a plurality of image sensors arranged in a main scanning direction and receiving reflected light of light emitted from a light source toward the document or the shading roller; and a processor, wherein the processor calculates difference data indicating a difference between arc surface read data, which indicates pixel values output from the image sensors, respectively, and obtained as the image sensor array receives the reflected light from the white reference arc surface, and flat surface read data, which indicates pixel values output from the image sensors, respectively, and obtained as the image sensor array receives the reflected light from the white reference flat surface, based on the arc surface read data and the flat surface read data, acquires corrected arc surface read data based on the arc surface read data and the difference data, corrects document read data, obtained as the image sensor array receives the reflected light from the document, based on the corrected arc surface read data to acquire corrected document read data, and forms image data corresponding to the document based on the corrected document read data.

DETAILED DESCRIPTION

Figure 1:
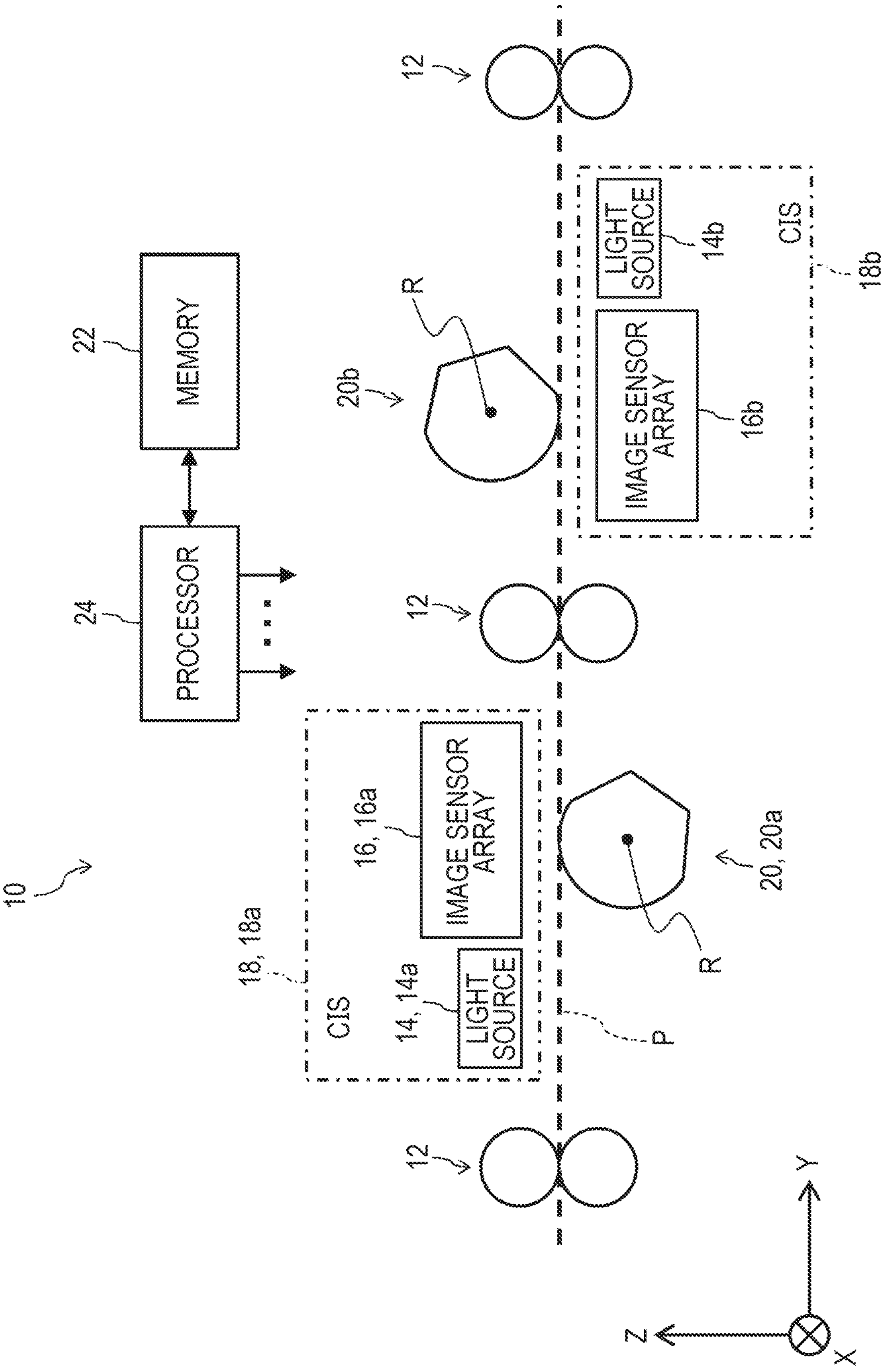
FIG. 1 is a schematic diagram illustrating a configuration of an image reading apparatus according to an embodiment.

FIG. 1 is a schematic diagram illustrating a configuration of an image reading apparatus 10 according to an embodiment. In each drawing of the present specification, an X-axis direction indicates a main scanning direction, a Y-axis direction indicates a sub scanning direction, and a Z-axis direction indicates a height direction. The image reading apparatus 10 is an apparatus that optically reads (in other words, performs a scanning process on) a document, which is a medium such as paper, and forms image data representing the document. The image reading apparatus 10 is, for example, a scanner or a multi-function peripheral having a scanning function. As illustrated in FIG. 1, the image reading apparatus 10 includes a document feed roller 12, a CIS 18 including a light source 14 and an image sensor array 16, a shading roller 20, a memory 22, and a processor 24.

The document feed roller 12 transports a document along a transport path P for the document. In the example of FIG. 1, a plurality of pairs of the document feed rollers 12 are provided, and each pair of the document feed rollers 12 rotates with the document being nipped in a nip portion thereof, thereby transporting the document.

The light source 14 emits light toward the document or the shading roller 20 for the scanning process. A plurality of the light sources 14 may be provided along the X-axis.

The image sensor array 16 includes a plurality of (for example, ten odd) image sensors arranged in the X-axis direction. Each of the image sensors receives reflected light of the light emitted from the light source 14 toward the document or the shading roller 20, and outputs a pixel value based on the received reflected light. The image sensor array 16 is provided to oppose the shading roller 20 across the transport path P.

The shading roller 20 is a columnar component extending substantially in a longitudinal direction along the image sensor array 16. The shading roller 20 is provided so as to oppose the image sensor array 16 across the transport path P.

A white reference surface configured to obtain shading data for shading correction is provided on an outer peripheral surface of the shading roller 20. The shading correction is correction for suppressing a variation in the pixel value output by the image sensor array 16 caused by a difference in the amount of light pf the light source 14 (including a difference between the light sources 14 and a difference due to a temporal change in the same light source 14), a difference in sensitivity of the image sensor (including a difference between the image sensors and a difference due to a temporal change in the same image sensor), or the like. The shading data is formed by the pixel value output by the image sensor array 16 receiving the reflected light of the light from the light source 14 reflected from the white reference surface of the shading roller 20.

Figure 2:
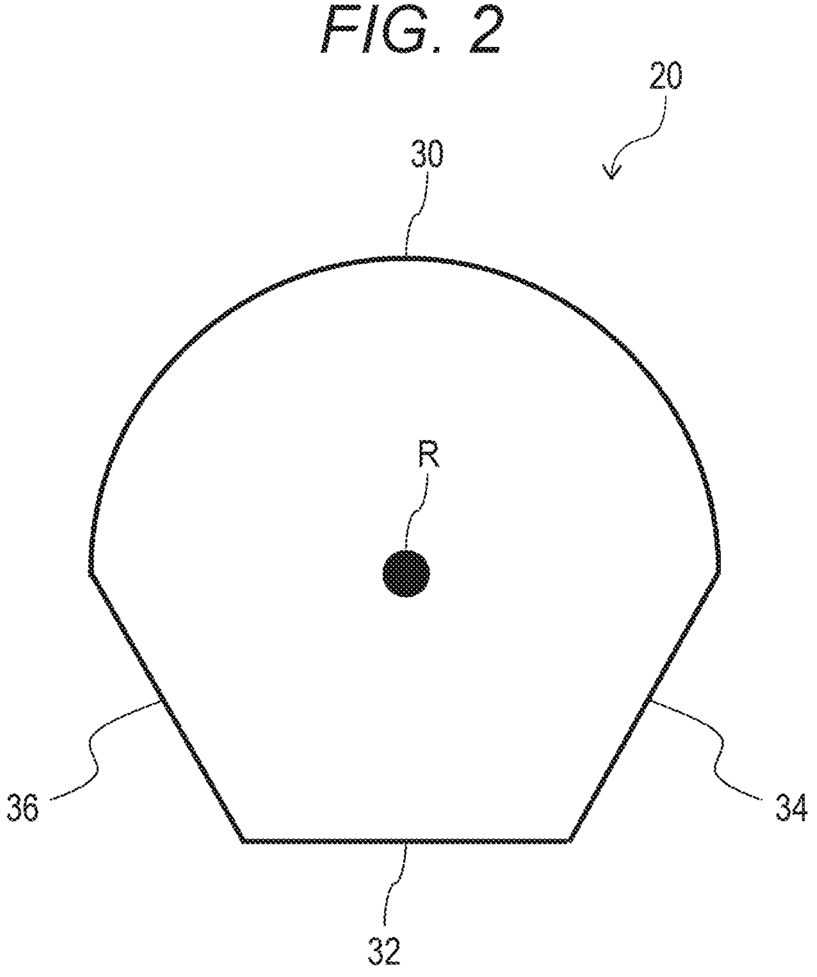
FIG. 2 is a conceptual view illustrating a schematic shape of a cross section of a shading roller according to the embodiment in a lateral direction.

FIG. 2 is a conceptual view illustrating a schematic shape of a cross section of the shading roller 20 in a lateral direction. As illustrated in FIG. 2, the shading roller 20 according to the embodiment includes, on the outer peripheral surface, a white reference arc surface 30 that is white, has an arc-shaped cross section in the lateral direction, and extends in the longitudinal direction. In addition, the shading roller 20 includes, on the outer peripheral surface, a white reference flat surface 32 that is white and extends in the longitudinal direction.

The shading roller 20 is rotatable about a rotation axis R extending in the longitudinal direction. Thus, a surface opposing the image sensor array 16 (or the light source 14) can be changed. Note that a cross-sectional shape of the white reference arc surface 30 is a semicircular shape centered on the rotation axis R in the embodiment.

The outer peripheral surface of the shading roller 20 may include flat surfaces 34 and 36 extending in the longitudinal direction, in addition to the white reference arc surface 30 and the white reference flat surface 32. For example, the flat surface 34 is black, and is used to improve the position detection accuracy of the document transported along the transport path P by setting the flat surface 34 to oppose the image sensor array 16. In addition, for example, the flat surface 36 is used as a contamination surface. There is a case where foreign matter (for example, paper dust) is generated from the document and adhere to the shading roller 20 when the document passes between the image sensor array 16 and the shading roller 20. In order to prevent such foreign matter from adhering to the white reference arc surface 30 and the white reference flat surface 32, the flat surface 36 is set to oppose the image sensor array 16 when the document passes between the image sensor array 16 and the shading roller 20.

In the embodiment, a distance from the rotation axis R to the white reference arc surface 30 is the same as a distance from the rotation axis R to the transport path P (see FIG. 1). As described above, the amount of light received by each of the image sensors included in the image sensor array 16 varies depending on a distance between the image sensor and the outer peripheral surface of the shading roller 20 or the document, and it is possible to obtain shading data by setting the distance from each of the image sensors to the document to be the same as the distance from each of the image sensors to the outer peripheral surface of the shading roller 20. For the same reason, a distance from the rotation axis R to the white reference flat surface 32 is preferably the same as the distance from the rotation axis R to the transport path P.

On the other hand, a distance from the rotation axis R to at least one of the white reference flat surface 32 and the flat surfaces 34 and 36 is smaller than the distance from the rotation axis R to the transport path P. For example, the distance from the rotation axis R to the flat surface 36, which is the contamination surface, is smaller than the distance from the rotation axis R to the transport path P in the embodiment. Thus, if the flat surface 36 is set to oppose to the image sensor array 16, it is possible to suppress interference between the document transported along the transport path P and the shading roller 20.

Figure 3:
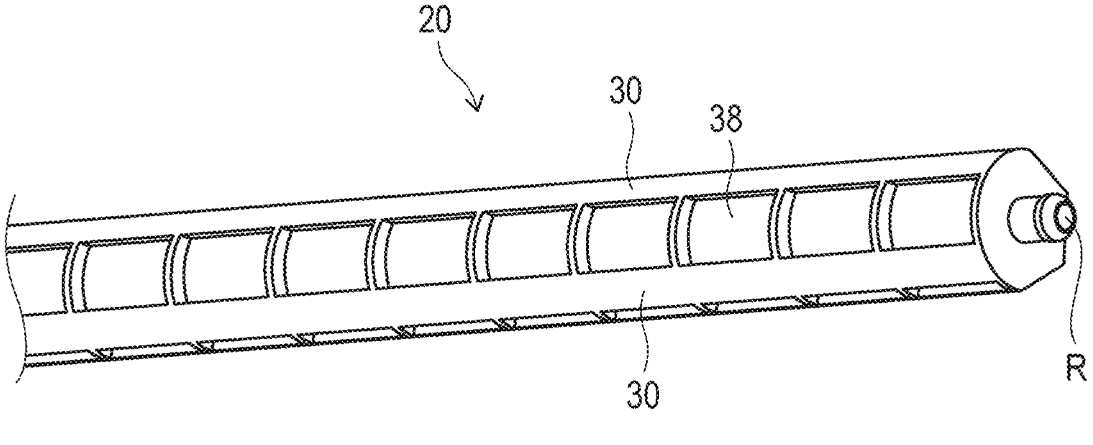
FIG. 3 is a perspective view of the shading roller according to the embodiment.

FIG. 3 is a perspective view of the shading roller 20 according to the embodiment. Specifically, a groove portion 38 extending in the longitudinal direction is provided at the center in the circumferential direction of the white reference arc surface 30 of the shading roller 20, and the white reference arc surface 30 is divided into two parts by the groove portion 38.

Figure 4:
FIG. 4 is a view illustrating a state where the shading roller is skewed with respect to an image sensor array.

FIG. 4 is a view illustrating a state where the shading roller 20 (20*b* in the example of FIG. 4) is skewed. Although it is ideal that the longitudinal direction of the shading roller 20 is parallel to a main scanning direction (that is, an arrangement direction of the image sensor array 16 (16*b* in the example of FIG. 4)) as described above, there is a case where the longitudinal direction of the shading roller 20 and the arrangement direction of the image sensor array 16 are not parallel due to the attachment accuracy of the shading roller 20 or the like. In the embodiment, even if the longitudinal direction of the shading roller 20 and the arrangement direction of the image sensor array 16 are not parallel and the shading roller 20 has an arc surface (the white reference arc surface 30) on its outer peripheral surface, appropriate shading data can be obtained as will be described below.

Returning to FIG. 1, the image reading apparatus 10 according to the embodiment has two combinations of the CISs 18 and the shading rollers 20. That is, the image reading apparatus 10 includes: a CIS 18*a* (that is, a light source 14*a* and an image sensor array 16*a*) for scanning a front surface of the document; a shading roller 20*a* for generating shading data of the CIS 18*a*; a CIS 18*b* (that is, a light source 14*b* and an image sensor array 16*b*) for scanning a back surface of the document; and a shading roller 20*b* for generating shading data of the CIS 18*b*. However, the image reading apparatus 10 may include only one combination of the CIS 18 and the shading roller 20. In the embodiment, methods for generating pieces of shading data for the CISs 18 are the same as each other, and thus, both the CIS 18*a* and the CIS 18*b*, and both the shading roller 20*a* and shading roller 20*b* will not be particularly distinguished in the following description.

The memory 22 includes, for example, a hard disk drive (HDD), a solid state drive (SSD), an embedded multi media card (eMMC), a read only memory (ROM), or a random access memory (RAM). The memory 22 stores an image reading program for operation of each unit of the image reading apparatus 10.

Figure 5:
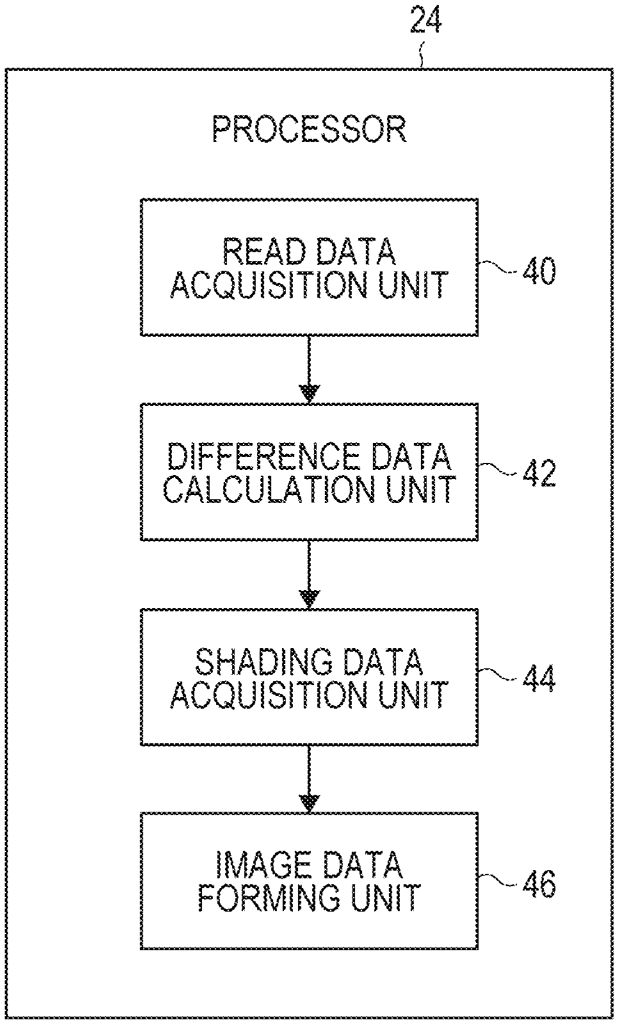
FIG. 5 is a schematic diagram of a configuration of a processor.

FIG. 5 is a schematic diagram of a configuration of the processor 24. The processor 24 exhibits functions as a read data acquisition unit 40, a difference data calculation unit 42, a shading data acquisition unit 44, and an image data forming unit 46 by the image reading program stored in the memory 22. Hereinafter, a shading data generation process by the processor 24 will be described together with these functions exhibited by the processor 24.

The read data acquisition unit 40 rotates the shading roller 20 such that the white reference arc surface 30 of the shading roller 20 opposes the image sensor array 16. In this state, the read data acquisition unit 40 acquires data indicating pixel values output from the respective image sensor included in the image sensor array 16, the pixel values being obtained by the image sensor array 16 receiving reflected light from the white reference arc surface 30 of light emitted from the light source 14 to the white reference arc surface 30. In this specification, this data is referred to as arc surface read data.

Figure 6:
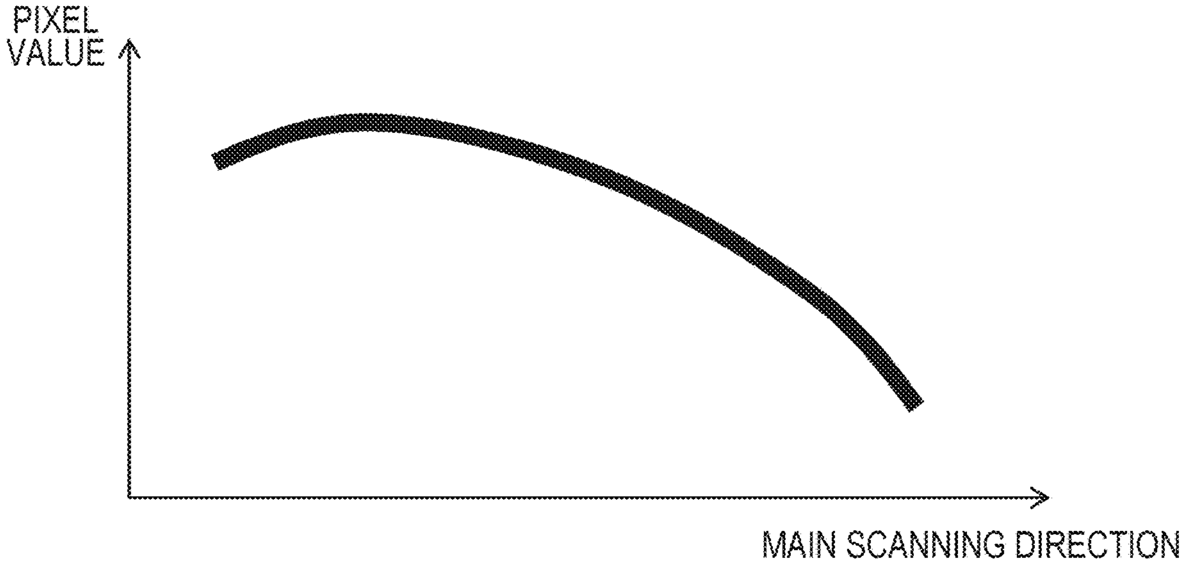
FIG. 6 is a view illustrating an example of arc surface read data.

FIG. 6 is a view illustrating an example of the arc surface read data. A horizontal axis represents (the image sensors arranged in) the X-axis direction, that is, the main scanning direction, and a vertical axis represents a pixel value output from each of the image sensors in FIG. 6 (and the same applies to FIGS. 7 and 13 to be described later). Note that the pixel value is, for example, a brightness value.

Figure 21:
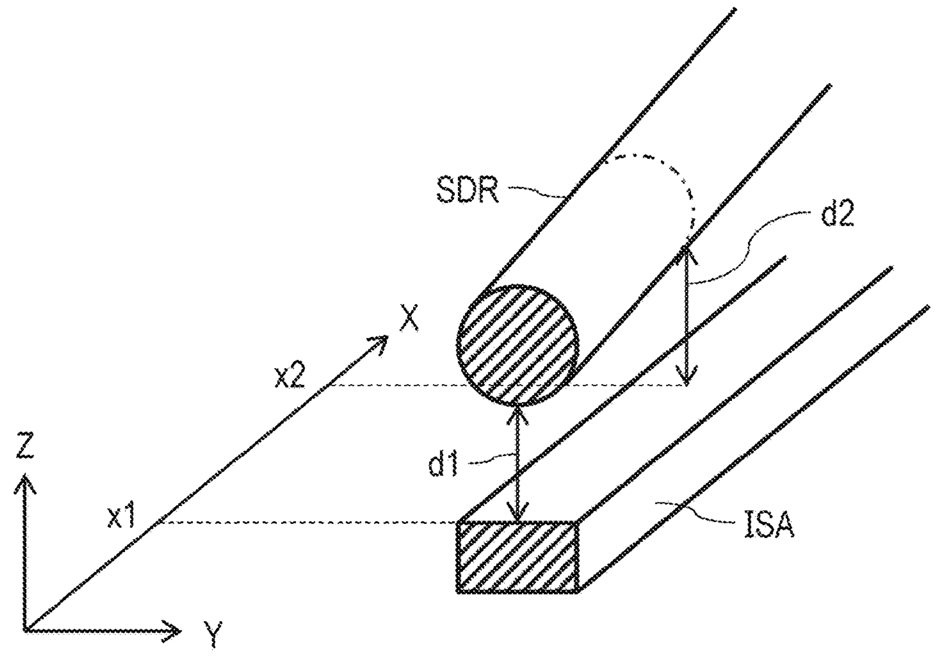
FIG. 21 is a perspective view illustrating a state where the shading roller having a circular cross-sectional shape is skewed.
Figure 22:
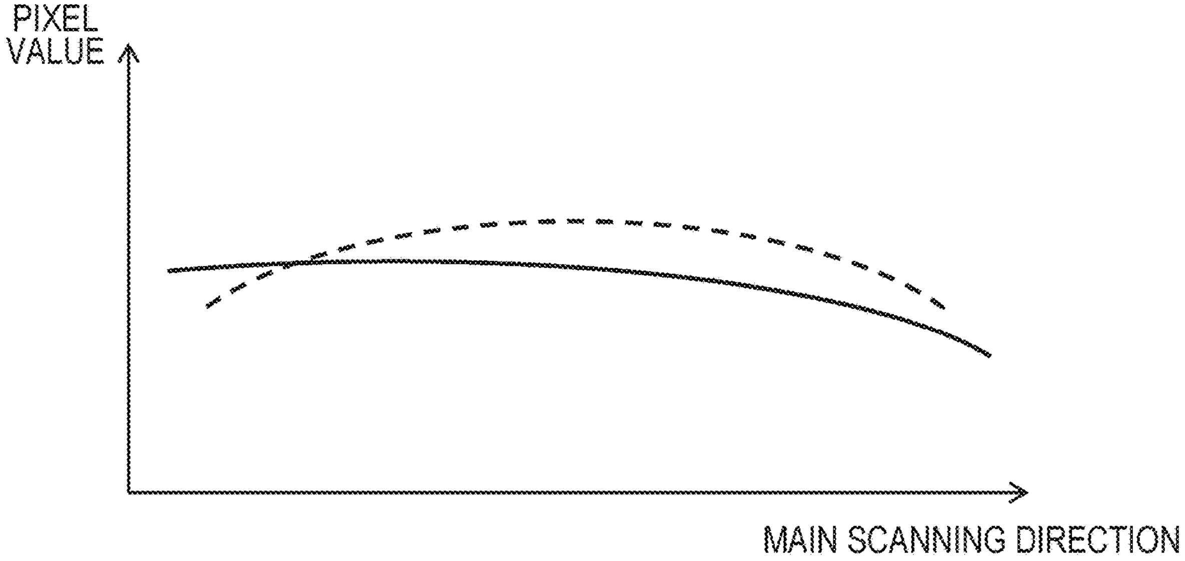
FIG. 22 is a view illustrating an example of shading data.

FIG. 6 illustrates the arc surface read data when the shading roller 20 is skewed. In the arc surface read data of FIG. 6, the pixel value output from the image sensor becomes extremely lower as an X-coordinate increases. This is because the shading roller 20 is skewed, and the outer peripheral surface of the shading roller 20 opposing the image sensor array 16 has the arc shape (the white reference arc surface 30) in the cross section in the lateral direction, so that a distance between the image sensor and the outer peripheral surface of the shading roller 20 increases as the X-coordinate increases (see FIG. 21). If shading correction is performed using such arc surface read data as shading data, appropriate shading correction cannot be performed.

Figure 7:
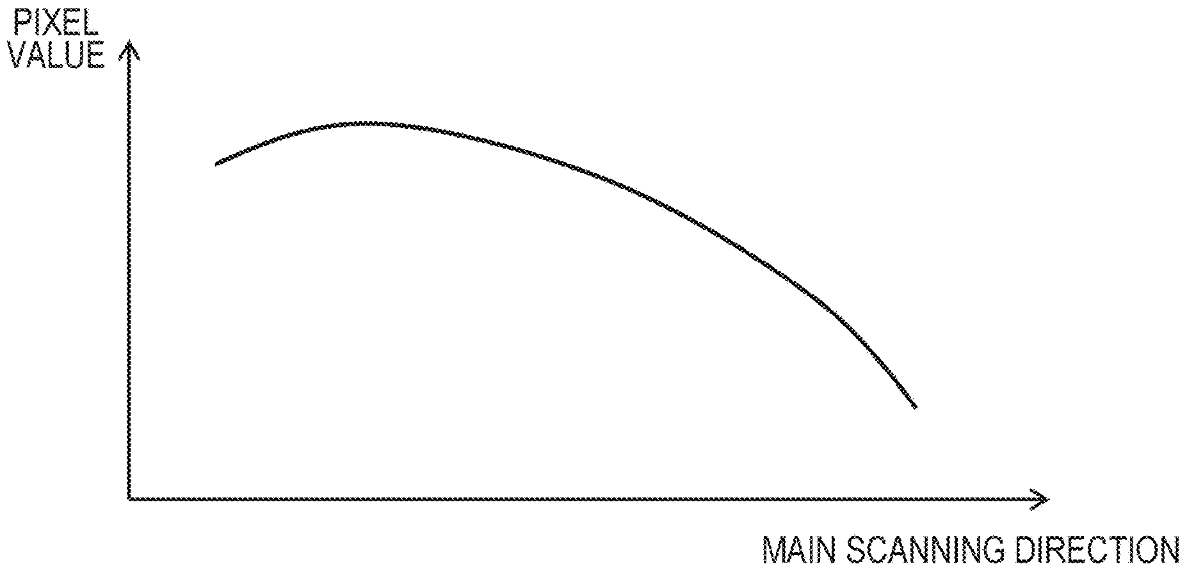
FIG. 7 is a view illustrating an example of arc surface frame data.

There is a case where high-frequency noise caused by the image sensor is superimposed on the arc surface read data. In FIG. 6, a state where such high-frequency noise is superimposed is represented by the thick line. The read data acquisition unit 40 may apply a low-pass filter to the arc surface read data in order to remove such high-frequency noise such that the difference data calculation unit 42, which will be described later, can calculate suitable difference data (described later). In the present specification, data obtained by performing the low-pass filter to the arc surface read data is referred to as arc surface frame data. FIG. 7 illustrates the arc surface frame data obtained by applying the low-pass filter to the arc surface read data illustrated in FIG. 6.

Note that the read data acquisition unit 40 does not necessarily apply the low-pass filter to the arc surface read data. For example, in a case where there is not too much high-frequency noise superimposed on the arc surface read data, the read data acquisition unit 40 does not necessarily apply the low-pass filter to the arc surface read data.

In addition, the read data acquisition unit 40 rotates the shading roller 20 such that the white reference flat surface 32 of the shading roller 20 opposes the image sensor array 16. In this state, the read data acquisition unit 40 acquires data indicating pixel values output from the respective image sensor included in the image sensor array 16, the pixel values being obtained by the image sensor array 16 receiving reflected light from the white reference flat surface 32 of light emitted from the light source 14 to the white reference flat surface 32. In this specification, this data is referred to as flat surface read data.

Figure 8:
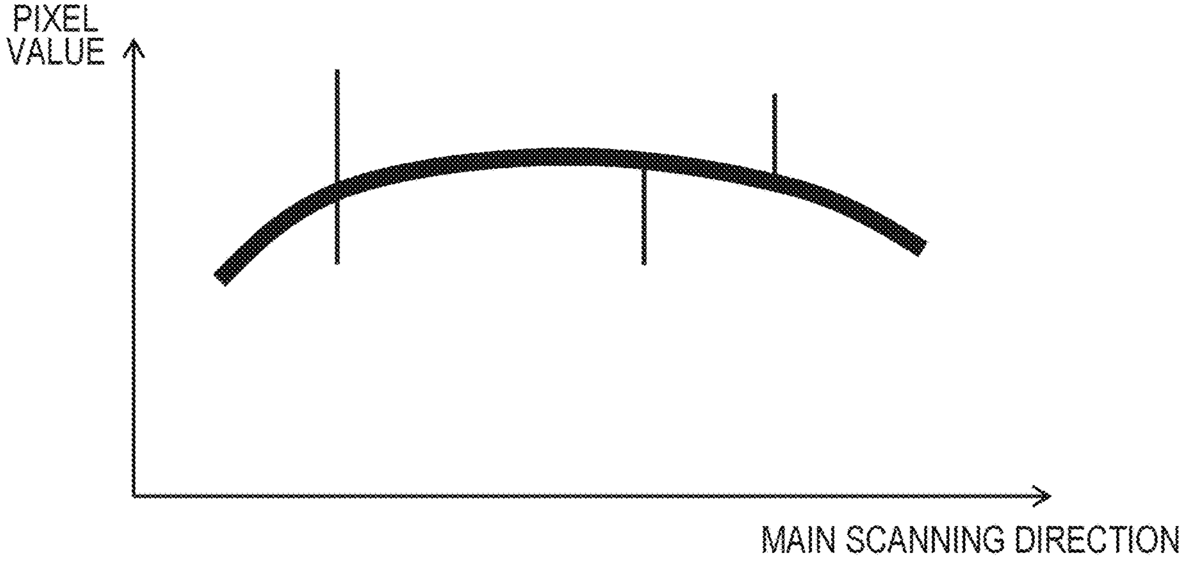
FIG. 8 is a view illustrating an example of flat surface read data.

FIG. 8 is a view illustrating an example of the flat surface read data. FIG. 8 illustrates the flat surface read data when the shading roller 20 is skewed. In a case where the outer peripheral surface of the shading roller 20 opposing the image sensor array 16 is a flat surface (the white reference flat surface 32) even when the shading roller 20 is skewed, the distance between the image sensor and the outer peripheral surface of the shading roller 20 does not vary with a change in the X-coordinate since the outer peripheral surface of the shading roller 20 is the flat surface. Therefore, an influence of the skew of the shading roller 20 does not appear in the flat surface read data. In FIG. 8, pixel values are lower at both end portions as compared with the central portion of the X-coordinates (that is, in the main scanning direction) due to not the skew of the shading roller 20 but a position of the light source 14 or the like.

In this manner, since the flat surface read data is not affected by the skew of the shading roller 20, it is conceivable to perform shading correction by using the flat surface read data as the shading data. However, in a case where foreign matter exists between the outer peripheral surface of the shading roller 20 and the image sensor array 16, it is difficult to reduce an influence of the foreign matter in the flat surface read data as compared with the arc surface read data as will be described in detail later. Note that the term "foreign matter" is a concept including not only dirt and debris fixed to the shading roller 20 but also floating debris located between the outer peripheral surface of the shading roller 20 and the image sensor array 16. Therefore, the influence of the foreign matter sometimes appears in the flat surface read data (a protruding portion protruding in the up-down direction in FIG. 8 corresponds to the influence of the foreign matter), and thus, there is a case where appropriate shading correction cannot be performed if the shading correction is performed by using the flat surface read data as the shading data.

Figure 9:
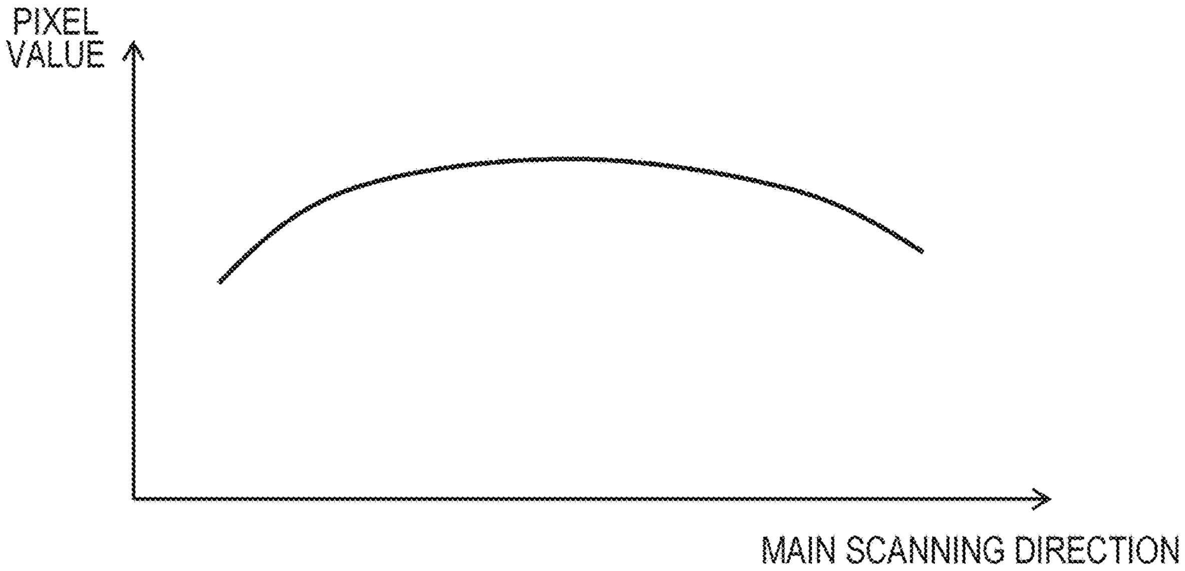
FIG. 9 is a view illustrating an example of flat surface frame data.

There is a case where high-frequency noise caused by the image sensor is superimposed on the flat surface read data, which is similar to the arc surface read data. In FIG. 8, a state where such high-frequency noise is superimposed is represented by the thick line. In addition, the flat surface read data in the example of FIG. 8 is affected by the foreign matter existing between the white reference flat surface 32 and the image sensor array 16 when the flat surface read data is acquired. The read data acquisition unit 40 may apply a low-pass filter to the flat surface read data in order to remove such influences of the high-frequency noise and the foreign matter such that the difference data calculation unit 42 can calculate suitable difference data. In the present specification, data obtained by performing the low-pass filter to the flat surface read data is referred to as flat surface frame data. FIG. 9 illustrates the flat surface frame data obtained by applying the low-pass filter to the flat surface read data illustrated in FIG. 8.

Note that the read data acquisition unit 40 does not necessarily apply the low-pass filter to the flat surface read data. For example, in a case where the flat surface read data is affected little by the high-frequency noise and the foreign matter, the read data acquisition unit 40 does not necessarily apply the low-pass filter to the flat surface read data.

The difference data calculation unit 42 calculates difference data indicating a difference between the arc surface read data and the flat surface read data based on the arc surface read data and the flat surface read data acquired by the read data acquisition unit 40. In a case where the read data acquisition unit 40 acquires the arc surface frame data based on the arc surface read data and the flat surface frame data based on the flat surface read data, the difference data calculation unit 42 calculates difference data based on the arc surface frame data and the flat surface frame data. In the embodiment, the difference data calculation unit 42 calculates the difference data by dividing the arc surface frame data (see FIG. 7) by the flat surface frame data (see FIG. 9).

Figure 10:
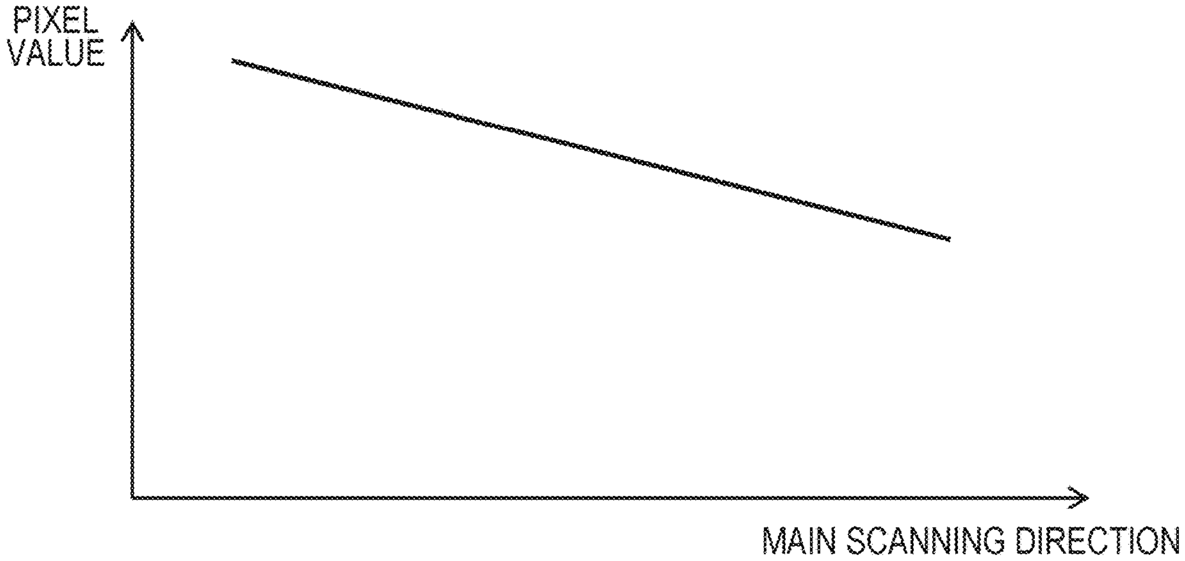
FIG. 10 is a view illustrating an example of difference data.

FIG. 10 is a view illustrating an example of the calculated difference data. As described above, the arc surface read data or the arc surface frame data is data affected by the skew of the shading roller 20, whereas the flat surface read data or the flat surface frame data is data not affected by the skew of the shading roller 20. Therefore, it can be said that the difference data is data representing the amount of variation in a pixel value due to the influence of the skew of the shading roller 20 at each position in the main scanning direction.

The difference data calculation unit 42 may calculate difference data by dividing the arc surface read data by the flat surface read data.

The shading data acquisition unit 44 acquires shading data as corrected arc surface read data based on the arc surface read data (see FIG. 6) acquired by the read data acquisition unit 40 and the difference data (see FIG. 10) calculated by the difference data calculation unit 42. As described above, the arc surface read data or the arc surface frame data is the data affected by the skew of the shading roller 20, and the difference data represents the amount of variation in the pixel value at each position in the main scanning direction due to the skew of the shading roller 20. Therefore, the shading data acquisition unit 44 can obtain the arc surface read data in which the influence of the skew of the shading roller 20 is reduced (that is, the shading data as the corrected arc surface read data) based on the arc surface read data and the difference data. In the embodiment, the shading data acquisition unit 44 divides the arc surface frame data by the difference data to acquire the shading data.

Figure 11:
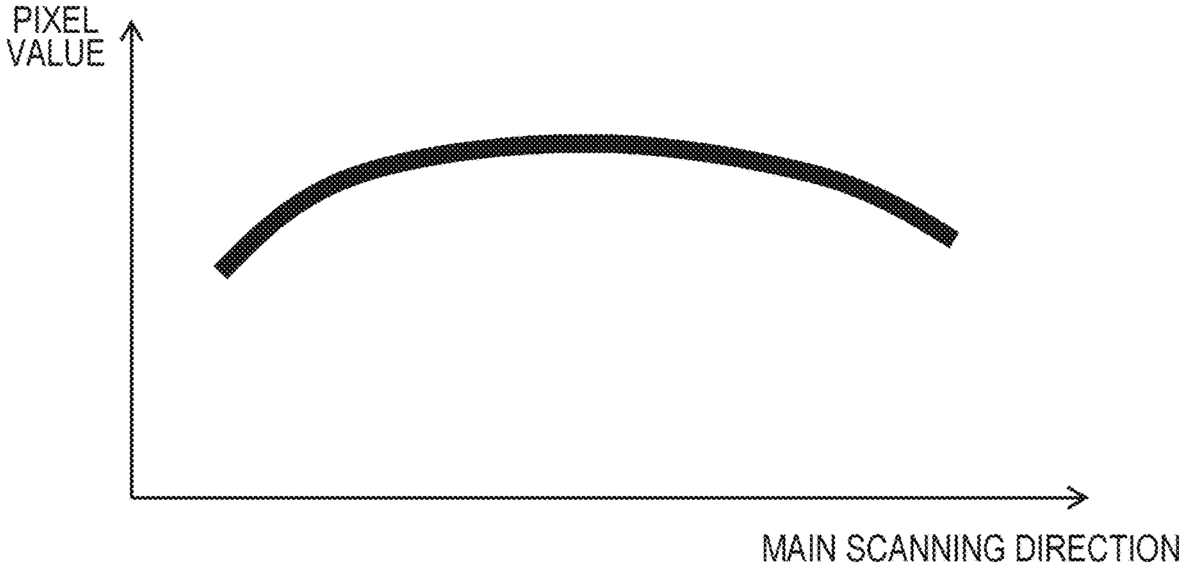
FIG. 11 is a view illustrating an example of shading data.

FIG. 11 is a view illustrating examples of the shading data. As can be seen from a comparison between the arc surface read data illustrated in FIG. 6 and the shading data illustrated in FIG. 11, the influence of the skew of the shading roller 20 is reduced in the shading data. Since the high-frequency noise is superimposed on the arc surface read data, the high-frequency noise is also superimposed on the shading data in FIG. 11. The high-frequency noise caused by the image sensor is similarly superimposed on image data obtained by the image sensor array 16 actually reading the document. Therefore, since the high-frequency noise is superimposed on the shading data, more appropriate shading correction may be performed.

The image data forming unit 46 causes the light source 14 to irradiate the document transported along the transport path P with light, and acquires document read data obtained by the image sensor array 16 receiving reflected light from the document.

In addition, the image data forming unit 46 corrects the acquired document read data based on the shading data (see FIG. 11) acquired by the shading data acquisition unit 44, and acquires corrected document read data. Since a conventional method may be employed as a method for correcting the document read data based on the shading data, a detailed description thereof is omitted here. For example, in the shading data of FIG. 11, since the pixel values are lower at both end portions as compared with the central portion in the main scanning direction, the image data forming unit 46 corrects the document read data based on the shading data so as to raise pixel values in both the end portions as compared with the central portion in the main scanning direction.

Further, the image data forming unit 46 forms image data corresponding to the document based on the corrected document read data. The formed image data is stored in the memory 22 or is transmitted to an apparatus (for example, a personal computer or a server) outside the image reading apparatus 10 by a communication unit (not illustrated) included in the image reading apparatus 10.

As described above, even if the shading roller 20 is skewed and the outer peripheral surface of the shading roller 20 for obtaining the shading data is the arc surface (that is, the white reference arc surface 30), it is possible to obtain the shading data in which the influence of the skew of the shading roller 20 is reduced according to the embodiment.

Figure 12:
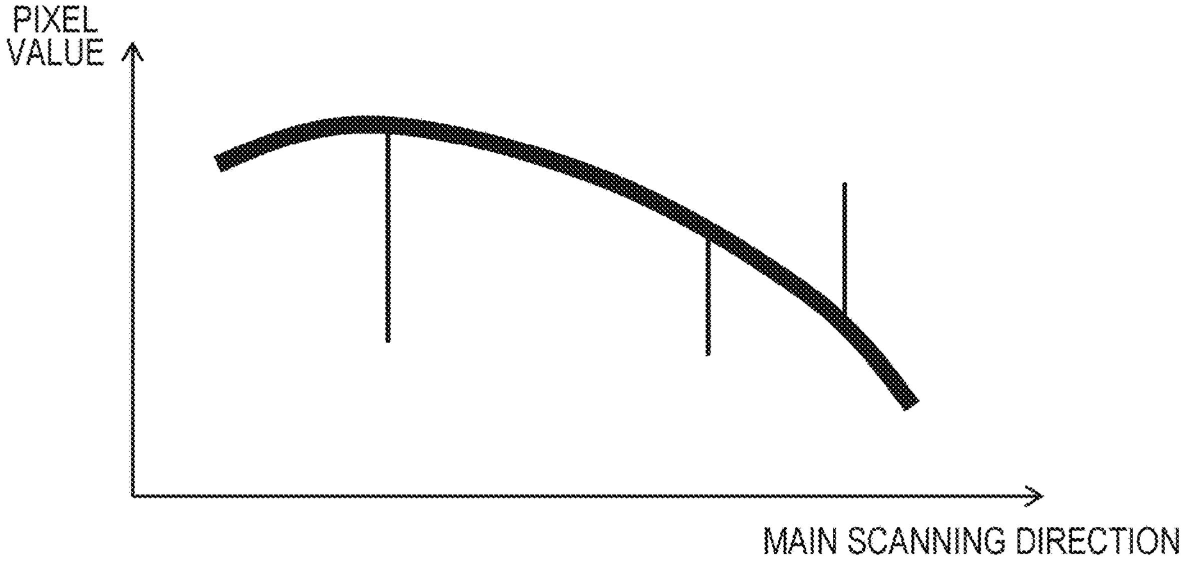
FIG. 12 is a view illustrating an example of arc surface read data in which an influence of foreign matter appears.

If the foreign matter exists between the white reference arc surface 30 and the image sensor array 16 when the arc surface read data is acquired, the influence of the foreign matter also appears in the arc surface read data. FIG. 12 illustrates the arc surface read data in which the influence of the foreign matter appears. A protruding portion protruding in the up-down direction in FIG. 12 corresponds to the influence of the foreign matter, which is similar to the flat surface read data illustrated in FIG. 8. In a case where the influence of the foreign matter appears in the arc surface read data, the influence of the foreign matter remains even in the shading data if the shading data acquisition unit 44 acquires the shading data based on the arc surface read data (see FIG. 12) and the difference data (see FIG. 10) as in the above-described method. Therefore, the processor 24 may perform the following processing in order to suppress the influence of the foreign matter in the shading data.

Figure 13:
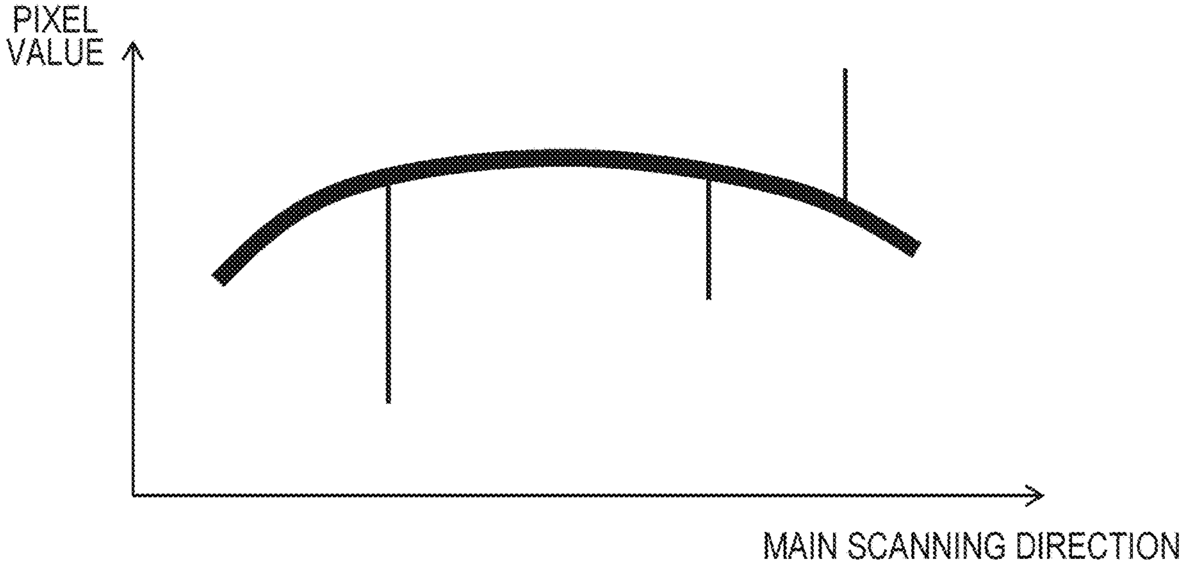
FIG. 13 is a view illustrating an example of intermediate arc surface read data.

Similarly to the above-described shading data, the shading data acquisition unit 44 corrects the arc surface read data (see FIG. 12) based on the difference data (see FIG. 10), thereby acquiring data in which the influence of the skew of the shading roller 20 is reduced although the influence of the foreign matter existing between the white reference arc surface 30 and the image sensor array 16 is not removed. In this specification, this data is referred to as intermediate arc surface read data. In the embodiment, the shading data acquisition unit 44 divides the arc surface read data by the difference data to acquire the intermediate arc surface read data. FIG. 13 illustrates an example of the intermediate arc surface read data.

Figure 14:
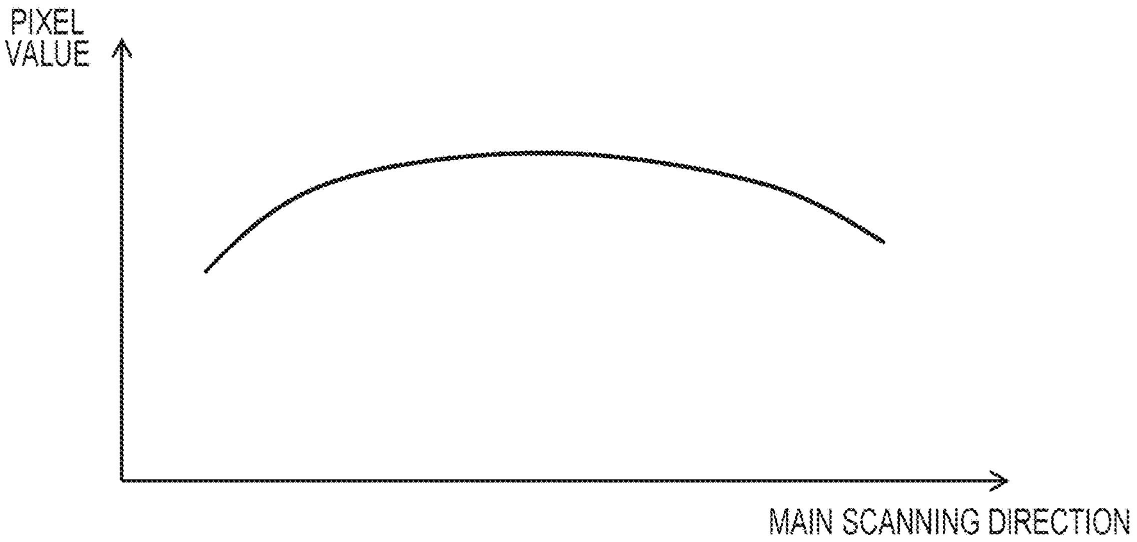
FIG. 14 is a view illustrating an example of intermediate arc surface frame data.

The shading data acquisition unit 44 applies a low-pass filter to the intermediate arc surface read data. In this specification, the intermediate arc surface read data to which the low-pass filter has been applied is referred to as intermediate arc surface frame data. Since the influence of the foreign matter appearing in the intermediate arc surface read data is a high-frequency component, the influences of the high-frequency noise and the foreign matter are reduced from the intermediate arc surface read data if the low-pass filter is applied to the intermediate arc surface read data. FIG. 14 illustrates an example of the intermediate arc surface frame data.

The shading data acquisition unit 44 obtains a difference between the intermediate arc surface read data (see FIG. 13) and the intermediate arc surface frame data (see FIG. 14), thereby acquiring arc surface foreign matter data indicating an image sensor affected by the foreign matter and the degree of the influence of the foreign matter on the image sensor in the arc surface read data.

Figure 15:
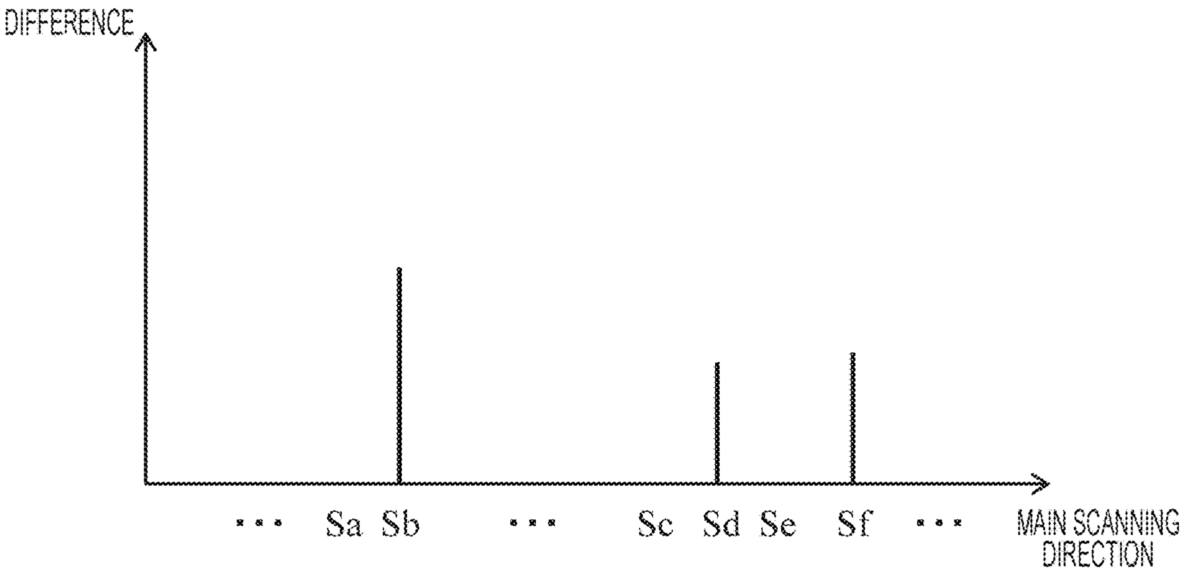
FIG. 15 is a view illustrating an example of arc surface foreign matter data.

FIG. 15 illustrates an example of the arc surface foreign matter data. In FIG. 15 (and FIG. 16 to be described later), a horizontal axis represents (the image sensors arranged in) the X-axis direction, that is, the main scanning direction, and a vertical axis represents a difference between pixel values. Since the intermediate arc surface read data is data in which the influence of the foreign matter appears, and the intermediate arc surface frame data is data in which the influence of the foreign matter is reduced, it can be said that the arc surface foreign matter data is data representing only the influence of the foreign matter. In FIG. 15, a position in the main scanning direction where a difference between pixel values appears (in other words, am image sensor) is an image sensor affected by the foreign matter, and the difference between pixel values indicates the degree of the influence of the foreign matter received by the image sensor. For example, it is illustrated in the example of FIG. 15 that image sensors Sb, Sd, and Sf are affected by the foreign matter. Note that the arc surface foreign matter data acquired by obtaining the difference between the intermediate arc surface read data and the intermediate arc surface frame data may include not only the influence of the foreign matter but also the influence of the high-frequency noise, but the amount of variation in the pixel value due to the high-frequency noise is small, and thus, the influence of the high-frequency noise is not illustrated in FIG. 15.

Figure 16:
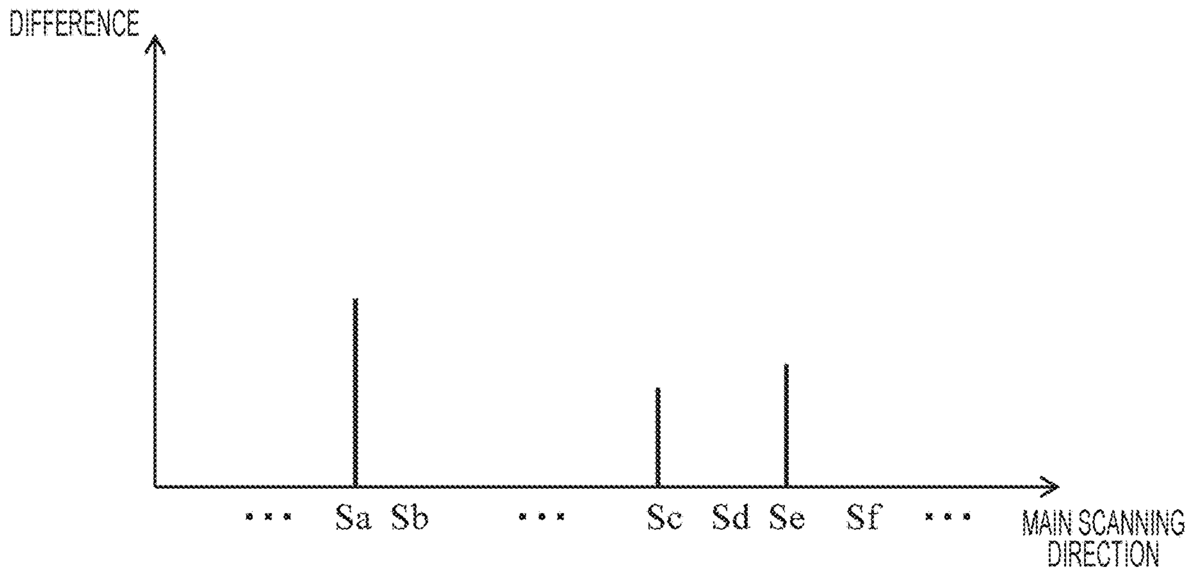
FIG. 16 is a view illustrating an example of flat surface foreign matter data.

In addition, the shading data acquisition unit 44 obtains a difference between the flat surface read data (see FIG. 8) and the flat surface frame data (see FIG. 9) obtained by applying a low-pass filter to the flat surface read data, thereby acquiring flat surface foreign matter data indicating an image sensor affected by the foreign matter and the degree of the influence of the foreign matter on the image sensor in the flat surface read data. FIG. 16 illustrates an example of the flat surface foreign matter data. For example, it is illustrated in the example of FIG. 16 that image sensors Sa, Sc, and Se are affected by the foreign matter. Note that the flat surface foreign matter data may include not only the influence of the foreign matter but also the influence of the high-frequency noise, but the amount of variation in the pixel value due to the high-frequency noise is small, and thus, the influence of the high-frequency noise is not illustrated in FIG. 16.

Next, the shading data acquisition unit 44 synthesizes the intermediate arc surface read data and the flat surface read data based on the arc surface foreign matter data and the flat surface foreign matter data to acquire the shading data as the corrected arc surface read data. Specifically, the shading data acquisition unit 44 acquires the shading data by performing synthesis using pixel values of the intermediate arc surface read data for an image sensor in which the influence of the foreign matter indicated by the arc surface foreign matter data is smaller than the influence of the foreign matter indicated by the flat surface foreign matter data, and using pixel values of the flat surface read data for an image sensor in which the influence of the foreign matter indicated by the flat surface foreign matter data is smaller than the influence of the foreign matter indicated by the arc surface foreign matter data. For example, in a case where the arc surface foreign matter data is the data as illustrated in FIG. 15 and the flat surface foreign matter data is the data as illustrated in FIG. 16, the shading data acquisition unit 44 acquires the shading data by performing synthesis using pixel values of the arc surface read data for the image sensors Sa, Sc, and Se and uses pixel values of the flat surface read data for the image sensors Sb, Sd, and Sf.

In addition, it is preferable for the read data acquisition unit 40 to acquire arc surface read data in which noise is reduced. For example, the read data acquisition unit 40 may cause each of the image sensors to output a pixel value a plurality of times in a state where light is emitted from the light source 14 toward the white reference arc surface 30, and calculate an output pixel value of the image sensor based on a plurality of the pixel values arranged in time series output from each of the image sensors.

Figure 17:
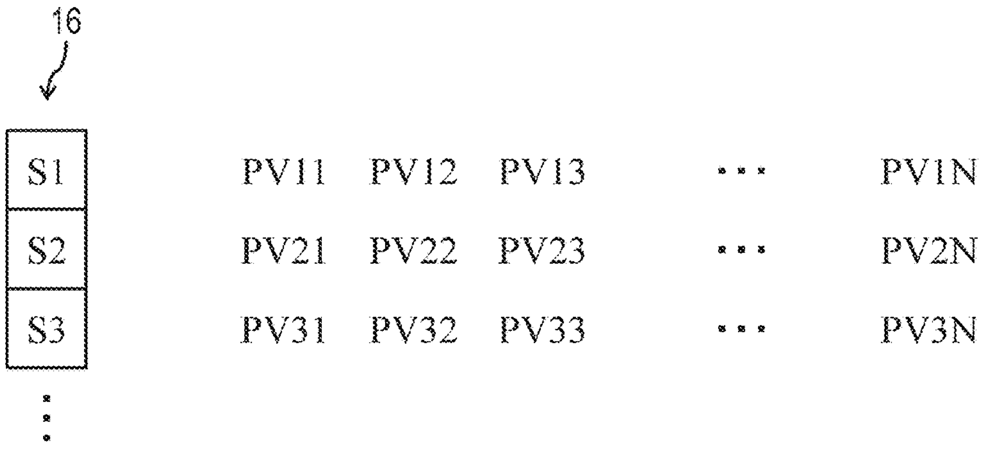
FIG. 17 is a conceptual view illustrating N time-series pixel values, related to reflected light from a white reference arc surface, output from image sensors, respectively.

For example, the read data acquisition unit 40 causes each of the image sensors to repeatedly output a pixel value related to reflected light from the white reference arc surface 30 N times, and acquires N time-series pixel values. FIG. 17 illustrates a state where the image sensor S1 outputs N pixel values PV11, PV12, PV13, . . . , and PV1N, the image sensor S2 outputs N pixel values PV21, PV22, PV23, . . . , and PV2N, and the image sensor S3 outputs N pixel values PV31, PV32, PV33, . . . , and PV3N. Then, the read data acquisition unit 40 calculates a value obtained by adding up the N pixel values using a predetermined first correction coefficient for each of the image sensors to determine a first representative pixel value. For example, the read data acquisition unit 40 can determine the first representative pixel value by dividing the sum of the N pixel values by N which is the first correction coefficient. Then, the first representative pixel values for the respective image sensors are acquired as the arc surface read data. Thus, for example, noise suddenly output by the image sensor can be reduced in the arc surface read data.

Similarly, the read data acquisition unit 40 may acquire flat surface read data in which noise is reduced. For example, the read data acquisition unit 40 may cause each of the image sensors to output a pixel value a plurality of times in a state where light is emitted from the light source 14 toward the white reference flat surface 32, and calculate an output pixel value of the image sensor based on a plurality of the pixel values arranged in time series output from each of the image sensors.

Figure 18:
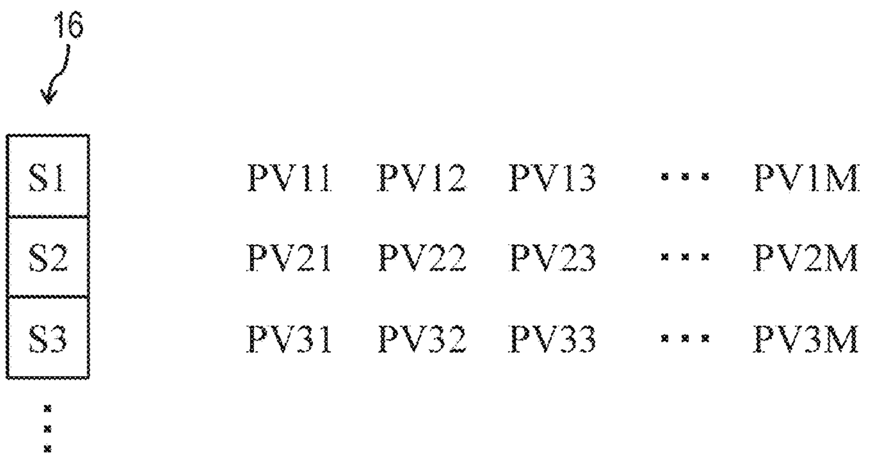
FIG. 18 is a conceptual view illustrating M time-series pixel values, related to reflected light from a white reference flat surface, output from the image sensors, respectively.

For example, the read data acquisition unit 40 causes each of the image sensors to repeatedly output a pixel value related to reflected light from the white reference flat surface 32 M times, and acquires M time-series pixel values. FIG. 18 illustrates a state where the image sensor S1 outputs M pixel values PV11, PV12, PV13, . . . , and PV1M, the image sensor S2 outputs M pixel values PV21, PV22, PV23, . . . , and PV2M, and the image sensor S3 outputs M pixel values PV31, PV32, PV33, . . . , and PV3M. Then, the read data acquisition unit 40 calculates a value obtained by adding up the M pixel values using a predetermined second correction coefficient for each of the image sensors to determine a second representative pixel value. For example, the read data acquisition unit 40 can determine the second representative pixel value by dividing the sum of the M pixel values by M which is the second correction coefficient. Then, the second representative pixel values for the respective image sensors are acquired as the flat surface read data. Thus, for example, noise suddenly output by the image sensor can also be reduced in the flat surface read data.

Here, two types of read data, that is, the arc surface read data and the flat surface read data are used to acquire the shading data in the embodiment, but the number of times (N) each of the image sensors outputs a pixel value in acquiring the arc surface read data may be different from the number of times (M) each of the image sensors outputs a pixel value in acquiring the flat surface read data. In this case, the first correction coefficient used in calculating the first representative pixel value, which is a source of the arc surface read data, and the second correction coefficient used in calculating the second representative pixel value, which is a source of the flat surface read data, are different from each other.

In addition, the read data acquisition unit 40 may cause each of the image sensors to repeatedly output pixel values corresponding to the reflected light from the white reference arc surface 30 a plurality of times (N times) while rotating the shading roller 20 so as to acquire N pixel values in time series.

Figure 19:
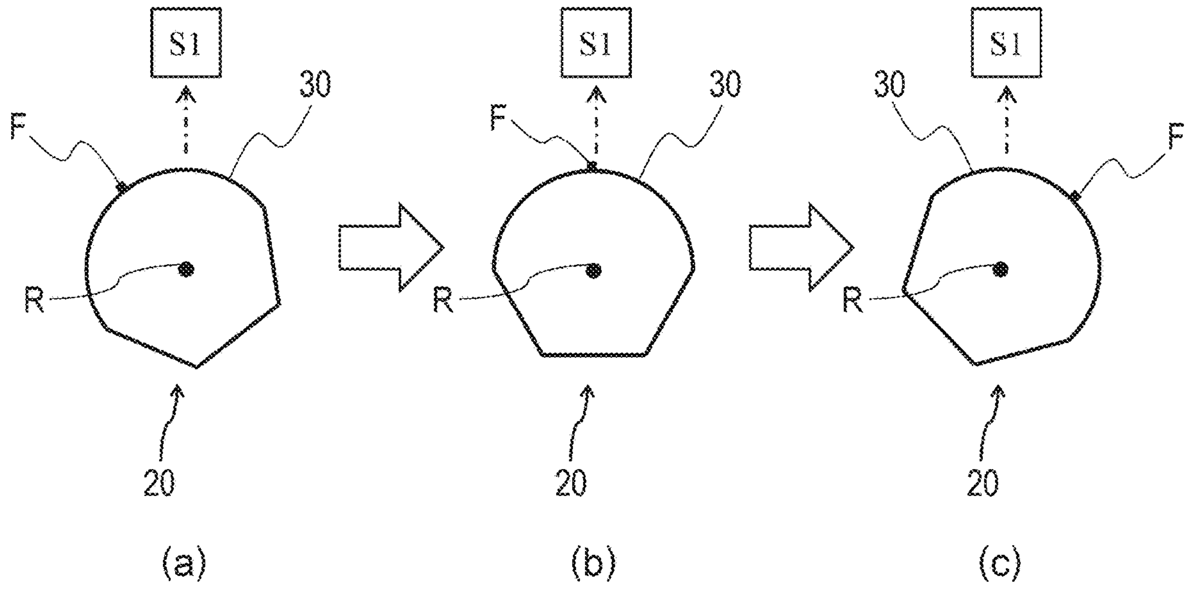
FIG. 19 is a conceptual view illustrating a state where the image sensor receives reflected light from the white reference arc surface of the rotating shading roller.
Figure 20:
FIG. 20 is a view illustrating a state where a shading roller is skewed with respect to an image sensor array.

FIG. 19 is a conceptual view illustrating a state where the image sensor S1 receives reflected light from the white reference arc surface 30 of the rotating shading roller 20. Here, it is assumed that foreign matter F adheres to the white reference arc surface 30. In such a case, when a rotation angle of the shading roller 20 is the state illustrated in a part (b) of FIG. 19, the foreign matter F exists at a position opposing the image sensor S1, and the image sensor S1 outputs a pixel value affected by the foreign matter F. On the other hand, when the rotation angle of the shading roller 20 is the state illustrated in a part (a) of FIG. 19 or a part (c) of FIG. 19, the foreign matter F does not exist at the position opposing the image sensor S1, and thus, the image sensor S1 outputs a pixel value that is not affected by the foreign matter F. That is, it is possible to reduce the number of pixel values affected by the foreign matter among the N pixel values acquired by the image sensor S1 as described above. Therefore, it is possible to reduce the influence of the foreign matter F on the first representative pixel value by determining the first representative pixel value based on such N pixel values.

In addition, a cross-sectional shape of the white reference arc surface 30 is a semicircular shape centered on the rotation axis R in the embodiment, and thus, a distance between the image sensor S1 and the white reference arc surface 30 does not vary even when the shading roller 20 is rotated.

Although the embodiment according to the present invention has been described above, the present invention is not limited to the above-described embodiment, and various modifications can be made without departing from the gist of the present invention.

In the above-described embodiment, the processor refers to a processing device in a broad sense, and includes at least one of a general-purpose processing device (for example, a central processing unit (CPU)) or a dedicated processing device (for example, a graphics processing unit (GPU), an application specific integrated circuit (ASIC), a field programmable gate array (FPGA), a programmable logic device, or the like). The processor may be configured by cooperation of a plurality of processing devices existing at physically separated positions, instead of being configured using one processing device.

Supplementary Notes (((1)))

An image reading apparatus comprising:

a shading roller that has a columnar shape extending in a longitudinal direction and is rotatable about a rotation axis extending in the longitudinal direction, the shading roller including, on an outer peripheral surface, a white reference arc surface which is white, has an arc-shaped cross section in a lateral direction, and extends in the longitudinal direction, and a white reference flat surface which is white, is a flat surface, and extends in the longitudinal direction;

an image sensor array that is provided to oppose the shading roller across a transport path of a document, and includes a plurality of image sensors arranged in a main scanning direction and receiving reflected light of light emitted from a light source toward the document or the shading roller; and a processor, wherein the processor calculates difference data indicating a difference between arc surface read data, which indicates pixel values output from the image sensors, respectively, and obtained as the image sensor array receives the reflected light from the white reference arc surface, and flat surface read data, which indicates pixel values output from the image sensors, respectively, and obtained as the image sensor array receives the reflected light from the white reference flat surface, based on the arc surface read data and the flat surface read data, acquires corrected arc surface read data based on the arc surface read data and the difference data, corrects document read data, obtained as the image sensor array receives the reflected light from the document, based on the corrected arc surface read data to acquire corrected document read data, and forms image data corresponding to the document based on the corrected document read data.

(((2)))

The image reading apparatus according to (((1))), wherein the processor calculates the difference data based on arc surface frame data obtained by applying a low-pass filter to the arc surface read data and flat surface frame data obtained by applying a low-pass filter to the flat surface read data.

(((3)))

The image reading apparatus according to (((2))), wherein the processor corrects the arc surface read data based on the difference data to acquire intermediate arc surface read data, obtains a difference between the intermediate arc surface read data and intermediate arc surface frame data, obtained by applying a low-pass filter to the intermediate arc surface read data, to acquire arc surface foreign matter data indicating any of the image sensors affected by foreign matter existing between the white reference arc surface and the image sensor array when the arc surface read data is acquired and a degree of an influence of the foreign matter on the image sensor, obtains a difference between the flat surface read data and the flat surface frame data to acquire flat surface foreign matter data indicating any of the image sensors affected by foreign matter existing between the white reference flat surface and the image sensor array when the flat surface read data is read, and a degree of an influence of the foreign matter on the image sensor, and performs synthesis using a pixel value of the intermediate arc surface read data for the image sensor for which the influence of the foreign matter indicated by the arc surface foreign matter data is smaller than the influence of the foreign matter indicated by the flat surface foreign matter data and using a pixel value of the flat surface read data for the image sensor for which the influence of the foreign matter indicated by the flat surface foreign matter data is smaller than the influence of the foreign matter indicated by the arc surface foreign matter data to acquire the corrected arc surface read data.

(((4)))

The image reading apparatus according to (((1))), wherein the processor determines a first representative pixel value for each of the image sensors by dividing a value, obtained by adding up N time-series pixel values obtained as the image sensor repeatedly outputs the pixel values related to the reflected light from the white reference arc surface N times, by a first correction coefficient, and acquires the first representative pixel value for each of the image sensors as the arc surface read data, and determines a second representative pixel value for each of the image sensors by dividing a value, obtained by adding up M, different from the N, time-series pixel values obtained as the image sensor repeatedly outputs the pixel values related to the reflected light from the white reference flat surface M times, by a second correction coefficient different from the first correction coefficient, and acquires the second representative pixel value for each of the image sensors as the flat surface read data.

(((5)))

The image reading apparatus according to (((4))), wherein each of the image sensors repeatedly outputs pixel values related to the reflected light from the white reference arc surface of the shading roller that is rotating N times to obtain the N time-series pixel values.

What is claimed is:

1. An image reading apparatus comprising:

a shading roller that has a columnar shape extending in a longitudinal direction and is rotatable about a rotation axis extending in the longitudinal direction, the shading roller including, on an outer peripheral surface, a white reference arc surface which is white, has an arc-shaped cross section in a lateral direction, and extends in the longitudinal direction, and a white reference flat surface which is white, is a flat surface, and extends in the longitudinal direction;

an image sensor array that is provided to oppose the shading roller across a transport path of a document, and includes a plurality of image sensors arranged in a main scanning direction and receiving reflected light of light emitted from a light source toward the document or the shading roller; and a processor, wherein the processor calculates difference data indicating a difference between arc surface read data, which indicates pixel values output from the image sensors, respectively, and obtained as the image sensor array receives the reflected light from the white reference arc surface, and flat surface read data, which indicates pixel values output from the image sensors, respectively, and obtained as the image sensor array receives the reflected light from the white reference flat surface, based on the arc surface read data and the flat surface read data, acquires corrected arc surface read data based on the arc surface read data and the difference data, corrects document read data, obtained as the image sensor array receives the reflected light from the document, based on the corrected arc surface read data to acquire corrected document read data, and forms image data corresponding to the document based on the corrected document read data.

2. The image reading apparatus according to claim 1, wherein the processor calculates the difference data based on arc surface frame data obtained by applying a low-pass filter to the arc surface read data and flat surface frame data obtained by applying a low-pass filter to the flat surface read data.

3. The image reading apparatus according to claim 2, wherein the processor corrects the arc surface read data based on the difference data to acquire intermediate arc surface read data, obtains a difference between the intermediate arc surface read data and intermediate arc surface frame data, obtained by applying a low-pass filter to the intermediate arc surface read data, to acquire arc surface foreign matter data indicating any of the image sensors affected by foreign matter existing between the white reference arc surface and the image sensor array when the arc surface read data is acquired and a degree of an influence of the foreign matter on the image sensor, obtains a difference between the flat surface read data and the flat surface frame data to acquire flat surface foreign matter data indicating any of the image sensors affected by foreign matter existing between the white reference flat surface and the image sensor array when the flat surface read data is read, and a degree of an influence of the foreign matter on the image sensor, and performs synthesis using a pixel value of the intermediate arc surface read data for the image sensor for which the influence of the foreign matter indicated by the arc surface foreign matter data is smaller than the influence of the foreign matter indicated by the flat surface foreign matter data and using a pixel value of the flat surface read data for the image sensor for which the influence of the foreign matter indicated by the flat surface foreign matter data is smaller than the influence of the foreign matter indicated by the arc surface foreign matter data to acquire the corrected arc surface read data.

4. The image reading apparatus according to claim 1, wherein the processor determines a first representative pixel value for each of the image sensors by dividing a value, obtained by adding up N time-series pixel values obtained as the image sensor repeatedly outputs the pixel values related to the reflected light from the white reference arc surface N times, by a first correction coefficient, and acquires the first representative pixel value for each of the image sensors as the arc surface read data, and determines a second representative pixel value for each of the image sensors by dividing a value, obtained by adding up M, different from the N, time-series pixel values obtained as the image sensor repeatedly outputs the pixel values related to the reflected light from the white reference flat surface M times, by a second correction coefficient different from the first correction coefficient, and acquires the second representative pixel value for each of the image sensors as the flat surface read data.

5. The image reading apparatus according to claim 4, wherein each of the image sensors repeatedly outputs pixel values related to the reflected light from the white reference arc surface of the shading roller that is rotating N times to obtain the N time-series pixel values.

* * * * *